United States Patent Office 3,817,926
Patented June 18, 1974

3,817,926
POLYAMIDE-IMIDES
Denis R. Pauze, Scotia, and Fred F. Holub, Schenectady, N.Y., assignors to General Electric Company
No Drawing. Continuation-in-part of abandoned application Ser. No. 98,032, Dec. 14, 1970. This application Sept. 12, 1972, Ser. No. 288,457
Int. Cl. C08g 20/32
U.S. Cl. 260—65                                13 Claims

ABSTRACT OF THE DISCLOSURE

Amide-imide group containing polymers are prepared by reacting the polymeric reaction product of carboxylic acid anhydride or dicarboxylic acid, or both, and polyamine with polyisocyanate material.

---

This application is a continuation-in-part of United States Patent Application No. 98,032, now abandoned, filed Dec. 14, 1970, in the names of Denis R. Pauze and Fred F. Holub and assigned to General Electric Comyany. Priority is claimed in this application as to all subject matter disclosed in the aforementioned parent application.

This invention relates to economical polymers containing amide and imide groups which form flexible and durable films and are useful, additionally, as wire enamels, varnishes, adhesives for laminates, paints and the like. The preparation of high molecular weight polymers containing amide and imide groups and having good film-forming and coating characteristics have heretofore been formed by a relatively costly process using as the acidic component chloroformyl anhydride, a halogenated material which necessitates precipitation of the reaction solution to eliminate the detrimental acid halide formed and then redissolving the polymer portion.

It is a primary object of the present invention to prepare such high molecular weight amide and imide group containing polymers of salutary film forming and other characteristics by a unique process.

Those features of the invention which are believed to be novel are set forth with particularity in the claims appended hereto. The invention will, however, be better understood from a consideration of the following description.

According to the present invention, there are reacted together carboxylic anhydride and an organic primary polyamine to form an amide-imide prepolymer. There is then added to this prepolymer and reacted therewith a polyisocyanate to produce a relatively high molecular weight block polymer having good film-forming and other characteristics.

Any of a number of carboxylic anhydrides can be used in connection with the present invention including but not limited to the following, among others, which will occur to those skilled in the art: trimellitic anhydride; 2,6,7-naphthalene tricarboxylic anhydride; 3,3'4-diphenyl tricarboxylic anhydride; 3,3',4-benzophenone tricarboxylic anhydride; 1,3,4-cyclopentane tetracarboxylic anhydride; 2,2',3-diphenyl tricarboxylic anhydride; diphenyl sulfone 3,3',4-tricarboxylic anhydride; diphenyl isopropylidene 3,3',4-tricarboxylic anhydride; 3,4,10-perylene tricarboxylic anhydride; 3,4-dicarboxyphenyl 3-carboxyphenyl ether anhydride; ethylene tricarboxylic anhydride; 1,2,5-naphthalene tricarboxylic anhydride; etc. The tricarboxylic acid materials can be characterized by the following formula:

I
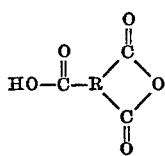

where R is a trivalent organic radical.

It has been found that up to 75 mole percent of the carboxylic anhydride can be replaced by substituted or unsubstituted aliphatic anhydride or diacid such as oxalic, maleic, succinic, glutaric, adipic, pimelic, suberic, azelaic, sebacic and dodecanediodic as well as unsaturated materials including maleic and fumaric materials, among others. Such acids can be expressed by the formula

II         HOOC—R'—COOH where R' is a divalent saturated or unsaturated aliphatic group or one containing a carbon-to-carbon double bond and having from about one to 40 carbon atoms, while the anhydrides can be expressed by

III

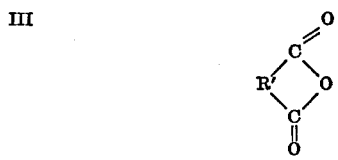

Also useful are aromatic anhydride or diacids which are well known to those skilled in the art including, among others, pyromellitic dianhydride, isophthalic acid and benzophenonetetracarboxylic dianhydride.

The aromatic polyamines useful in connection with the present invention are well known and may be expressed by the formula

IV         X—R"—(NH₂)ₙ where R" is an organic radical and $n$ is at least 2 and X is hydrogen, an amino group or organic group including those also containing at least one amino group.

The polyamines useful in connection with the present invention may also be expressed by the formula

V         R'''—(NH₂)ₙ where R''' is a member selected from the class cosisting of organic radicals of at least two carbon atoms (both halogenated and unhalogenated) including but not limited to, e.g., hydrocarbon radicals of up to 40 carbon atoms, and groups consisting of at least two aryl residues attached to each other through the medium of a member selected from the class consisting of an alkylene radical of from 1 to 10 carbon atoms,

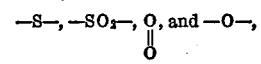

and $n$ is at least 2.

Among the specific amines useful for the present invention, alone or in admixture, are the following:

p-xylene diamine
bis(4-amino-cyclohexyl)methane
hexamethylene diamine
heptamethylene diamine
octamethylene diamine
nonamethylene diamine
decamethylene diamine
3-methyl-heptamethylene diamine
4,4'-dimethylheptamethylene diamine
2,11-diamino-dodecane
1,2-bis-(3-amino-propoxy)ethane
2,2-dimethyl propylene diamine
3-methoxy-hexamethylene diamine
2,5-dimethylhexamethylene diamine
2,5-dimethylheptamethylene diamine
5-methylnonamethylene diamine
1,4-diamino-cyclo-hexane
1,12-diamino-octadecane
2,5-diamino-1,3,4-oxadiazole
H₂N(CH₂)₃O(CH₂)₂O(CH₂)₃NH₂

H₂N(CH₂)₃S(CH₂)₃NH₂
H₂N(CH₂)₃N(CH₃)(CH₂)₃NH₂
meta-phenylene diamine
para-phenylene diamine
4,4'-diamino-diphenyl propane
4,4'-diamino-diphenyl methane
benzidine
4,4'-diamino-diphenyl sulfide
4,4'-diamino-diphenyl sulfone
3,3'-diamino-diphenyl sulfone
4,4'-diamino-diphenyl ether
2,6-diamino-pyradine
bis(4-amino-phenyl)diethyl silane
bis(4-amino-phenyl)diphenyl silane
bis(4-amino-phenyl)phosphine oxide
4,4'-diaminobenzophenone
bis(4-amino-phenyl)-N-methylamine
bis(4-aminobutyl)tetramethyldisiloxane
1,5-diaminonaphthalene
3,3'-dimethyl-4,4'-diamino-biphenyl
3,3'-dimethoxy benzidine
2,4-bis(beta-amino-t-butyl)toluene
toluene diamine
bis(para-beta-amino-t-butyl-phenyl)ether
para-bis(2-methyl-4-amino-pentyl)benzene
para-bis(1,1-dimethyl-5-amino-pentyl)benzene
m-xylylene diamine
polymethylene polyaniline Any polyisocyanate, that is, any isocyanate having two or more isocyanate groups, whether blocked or unblocked, can be used. Blocked isocyanates using as the blocking constituent phenols or alcohols, among others, can be used and in general provide a higher molecular weight final material which is advantageous as, for example, in varnishes. On the other hand, the unblocked isocyanates provide more flexible final materials. At any rate, the blocking material must be evaporated off as much as possible and there is no advantage from the purely reaction point of view to using the blocked material except as stated above. Typical of the blocked polyisocyanates is Mondur S wherein mixtures of 2,4- and 2,6-tolylene diisocyanate are reacted with trimethylol propane and blocked by esterification with phenol in the proportions of three moles of isocyanate, one more of trimethylol propane, and three moles of phenol. In Mondur SH the isocyanate groups of mixed 2,4- and 2,6-tolylene diisocyanate are blocked by esterification with cresol. Among specific polyisocyanates which are useful alone or in admixture are the following:

tetramethylenediisocyanate
hexamethylenediisocyanate
1,4-phenylenediisocyanate
1,3-phenylenediisocyanate
1,4-cyclohexylenediisocyanate
2,4-tolylenediisocyanate
2,5-tolylenediisocyanate
2,6-tolylenediisocyanate
3,5-tolylenediisocyanate
4-chloro-1,3-phenylenediisocyanate
1-methoxy-2,4-phenylenediisocyanate
1-methyl-3,5-diethyl-2,6-phenylenediisocyanate
1,3,5-triethyl-2,4-phenylenediisocyanate
1-methyl-3,5-diethyl-2,4-phenylenediisocyanate
1-methyl-3,5-diethyl-6-chloro-2,4-phenylenediisocyanate
6-methyl-2,4-diethyl-5-nitro-1,3-phenylenediisocyanate
p-xylylenediisocyanate
m-xylylenediisocyanate
4,6-dimethyl-1,3-xylylenediisocyanate
1,3-dimethyl-4,6-bis-(b-isocyanatoethyl)benzene
3-(a-isocyanatoethyl)-phenylisocyanate
1-methyl-2,4-cyclohexylenediisocyanate
4,4'-biphenylenediisocyanate
3,3'-dimethyl-4,4'-biphenylenediisocyanate
3,3'-dimethoxy-4,4'-biphenylenediisocyanate
3,3'-diethoxy-4,4-biphenylenediisocyanate
1,1-bis-(4-isocyanatophenyl)cyclohexane
4,4'-diisocyanato-diphenylether
4,4'-diisocyanato-dicyclohexylmethane
4,4'-diisocyanato-diphenylmethane
4,4'-diisocyanato-3,3'-dimethyldiphenylmethane
4,4'-diisocyanato-3,3'-dichlorodiphenylmethane
4,4'-diisocyanato-diphenyldimethylmethane
1,5-naphthylenediisocyanate
1,4-naphthylenediisocyanate
4,4',4''-triisocyanato-triphenylmethane
2,4,4'-triisocyanato-diphenylether
2,4,6-triisocyanato-1-methyl-3,5-diethylbenzene
o-tolidine-4,4'-diisocyanate
m-tolidine-4,4'-diisocyanate
benzophenone-4,4'-diisocyanate
biuret triisocyanates
polymethylenepolyphenylene isocyanate Generally speaking, a slight molar excess of carboxylic acid anhydride and organic polyamine is heated to about 200° C. to 245° C. in an inert atmosphere and solvent as above, driving off the water formed and forming an amide-imide group containing prepolymer. The polyisocyanate is then added and reacted to form a block amide-imide copolymer of relatively high molecular weight. It can be cured as by heating to form flexible film or coatings. Alternatively, the carboxylic anhydride and organic diamine can be reacted in equimolar proportions, still providing desirable flexible films or coatings, wire enamels, paints, laminate adhesives and the like.

The following examples will illustrate the practice of the present invention, it being realized that they are to be taken as exemplary only and not limiting in any way.

Example 1

A flask equipped with stirrer, thermometer, Vigreux column, Dean Stark trap and condenser, was charged under an atmosphere of nitrogen with 384 g. (2.0 moles) trimellitic anhydride, 396 g. (2 moles) methylene dianiline, 334 g. N-methyl pyrrolidone (MP) and 40 g. of xylene. The contents were stirred and heated at a temperature of about 220° C. until essentially all of the theoretical amount of water was collected. At this point, 656 cc. of MP solvent were added to reduce viscosity, the solids content at this point being 52 percent and the carboxyl content 4.3 percent. 300 g. of the above product were placed in a flask as above, there being added slowly at 90° C. small aliquots of a total of 19.6 g. of p,p'-diphenylmethanediisocyanate (methylene dianiline diisocyanate) over a period of about 4 hours, it being necessary for convenience to dilute the extremely viscous solution with MP solvent to a concentration of 18 percent solids. The intrinsic viscosity at 25° C. was 1.2 dl./g., indicating a polymer of very high molecular weight. A film cast from the above material on an aluminum substrate and cured at 135° C., 150° C., and 200° C. for one hour at each temperature produced an extremely flexible, clear film. When this material was applied on magnet wire as an overcoat on top of a polyesterimide, the flexibility was such that when the wire was extended 25 percent, it could be wound about a mandrel having the same diameter as the wire without failing.

Example 2

A flask equipped as in Example 1 was charged with 133.4 g. MP solvent, 192 g. (1 mole) trimellitic anhydride, 178.2 g. (0.9 mole) methylene dianiline and 40 g. xylene. The contents were stirred and heated to a temperature of about 227° C. with the theoretical amount of water being collected. The hot solution was diluted with an additional 236 g. of MP solvent to provide a prepolymer having a carboxyl content of 7 percent. There were charged into a flask equipped as above 100 g. of the above prepolymer along with 77 g. of MP solvent. The contents were stirred and 1.93 g. p,p-diphenylmethane diisocyanate were added. The contents were then heated to 200° C. with another 1.93 g. of the diisocyanate being added. At this point the carboxyl content was 4 percent. The contents were cooled to 90° C. and another 3.85 g. of diisocyanate added with heating up to 175° to 200° C., reducing the carboxyl content to 2.6 percent. The addition of another gram of the diisocyanate produced a viscous solution having a carboxyl content of 2 percent. A film cast on an aluminum substrate using this viscous solution and cured at 135° C., 150° C., and 200° C. each for one hour produced a clear, amber colored, flexible film.

Example 3

To a large reaction vessel equipped as in Example 1 there were charged 4,935 g. of MP solvent, 7,104 g. (37.0 moles) trimellitic anhydride, 6,593 g. (33.3 moles) methylene dianiline, 1,480 g. xylene and 13.6 g. triphenyl phosphite as a reaction accelerator. The contents were heated for a total of about 12 hours to a maximum temperature of 210° C. with the theoretical amount of 1,200 g. of water collected. At this point, 9,950 additional g. of MP solvent were added. A flask was charged with 333 g. of the above product, 117 g. MP solvent and heated to 60° C. To this mixture there were added 28 g. (0.226 equiv.) of methylenedianiline-diisocyanate in one-third aliquots. After two-thirds of the isocyanate had been added, the temperature was raised to 203° C. for 1½ hours, the solution then being cooled to 68° C., the remaining isocyanate added, and the reaction mixture being stirred for 4 hours. After 90 more grams of MP solvent had been added, the viscosity was Z one and three-quarters at 25 percent solids and the final carboxyl content was 1.67. A steel metal panel coated with this material and cured at 150° C. for one hour, 200° C. for one hour, and 300° C. for 25 minutes produced a tough, flexible, adherent film which did not fail when bent over a ⅛ inch diameter mandrel. When this material was applied over an overcoat on wire over a polyester imide wire enamel, the smoothness, flexibility, and continuity were accpetable. The cut-through temperature measured as in Pat. 2,936,296 was 380 to 360° C. The heat shock at 200° C. for one-half hour was 25+2X, the single scrape abrasion was 2380 g. and the repeat scrape (700 g.) was 115.

Example 4

A flask equipped as in Example 1 was charged with 192 g. (1.0 mole) trimellitic anhydride, 178.2 g. (0.9 mole) methylene dianiline, 133.4 g. MP solvent, and 40 g. of xylene. The contents were heated to a maximum of 230° C. for about 2 hours, 250 cc. additional MP solvent being added to reduce the viscosity. The free carboxyl content was 2.9 and the solids content was 47.6 percent. When it was attempted to prepare a film by laying down a solution on a metal plate and curing with heat, the resultant structure was incoherent and not flexible. To 220 g. of the above material there were also added 50 cc. MP solvent, the contents being heated to 90° C. while a total of 4 g. of p,p'-diphenylmethane diisocyanate were added over an eight-hour period. An additional 60 g. of MP solvent were added toward the end of the period to reduce the viscosity. The contents were added to a blender to break up any gel formation, a clear, high viscosity solution having an intrinsic viscosity of 1.2 dl./g. A film laid down on a metal panel from this material and cured as in previous examples was tough and flexible. A paint formulation was prepared by mixing pigment paste with 50 cc. of the above solution, a tough, flexible coating being obtained by spraying such solution on a panel and cured at 100° C., 150° C., and 250° C. for one hour each and at 302° C. for ten minutes, yielding a good, adherent, flexible film on the substrate.

Example 5

A flask equipped as in the preceding examples was charged with 20.9 g. (0.18 mole) hexamethylenediamine, 142 g. (0.72 mole) methylene dianiline, 192 g. (1.0 mole) trimellitic anhydride and 37.1 g. of cresylic acid. The contents were heated over a five-hour period to a maximum temperature of 216° C., increments of 37 g of cresylic acid for a total of 360 g. of cresylic acid being added over this period. The viscosity was Z 1¾ at 27.5 percent solids. To 500 g. of the above solution there were added 33 g. of methylene dianiline diisocyanate, the reaction mixture being heated over a two-hour period to 190° C., at which time 16.5 g. of isocyanate were added with further heating at the same temperature for an additional four hours. A film prepared by casting from the above solution on a glass plate and cured at 150° C. and 200° C. for one hour each and 240° C. for ten minutes produced a clear, tough film which could be bent 180° without cracking.

Example 6

A flask equipped as in Example 1 was charged with 20.9 g. (0.18 mole) hexamethylenediamine, 192 g. (1.0 mole) trimellitic anhydride, 143 g. (0.72) mole) methylene dianiline, and 323.1 g. cresylic acid, the contents being heated to a maximum temperature of 216° C. for a period of three and one-half hours. During this time 348 g. of a cresol-phenol mixture were added in small increments and the contents then brought to 27 percent by weight solids with the addition of further cresol-phenol solvent. To 500 g. of the above, 33 g. (0.132 mole) of methylene dianiline diisocyanate were added and the contents heated to 193° C. for three hours. A film prepared from the resulting solution by casting on a glass plate cured at 200° C. for one hour and at 240° C. for one-half hour was clear and flexible.

Example 7

To a flask equipped as in Example 1 there were charged 96.0 g. (0.5 mole) trimellitic anhydride, 178.2 g. (0.9 mole) methylene dianiline, 134 g. of cresol-phenol solvent and 0.5 g. of triphenyl phosphite as a catalyst, there being added additionally 94.0 g. (0.5 mole) azelaic acid. The mixture was heated at a temperature of 234° C. for about 2 hours. To this solution there were added 25.0 g. (0.1 mole) methylene dianiline diisocyanate, the solution being further heated for 3 hours at reflux. When applied to an electrical conductor, the wire enamel so produced had a flexibility at 25 percent elongation of 2X measured in the usual manner.

Example 8

A flask equipped as in Example 1 was charged with 96.0 g. (0.5 mole) trimellitic anhydride, 178.2 g. (0.9 mole) methylene dianiline, the contents being heated to a temperature of 170° C., at which point 100 g. of cresol-phenol mixed solvent was added. The temperature was brought to a maximum of 234° C. until the increasing viscosity made stirring impractical. About 1000 g. more of the cresol-phenol mixture were added and the solution cooled to room temperature. To this solution there were then added 25 g. (0.10 mole) of pp-methylene dianiline diisocyanate and the contents heated at reflux for three hours. When applied to copper wire as a wire enamel, the flexibility at 25 percent elongation was 4X. The heat shock after 30 minutes at 260° C. was 0 percent stretch and 2X and at 20 percent stretch was 3X. The repeat scrape abrasion was 76 and the single scrape abrasion was 2600. The cut-through temperature ranged from about 350° C. to 365° C.

Example 9

A container equipped as in Example 1 was charged under nitrogen with 163.5 g. (0.85 mole) trimellitic anhydride, 37.5 g. (0.2 mole) azelaic acid, 198.26 g. (1.0 mole) p,p'-methylene dianiline, 400 g. cresol and 30 ml. xylene. The contents were stirred and heated at a temperature of about 190° C. until essentially all of the theoretical amount of water was removed. At this point, 12.5 g. (0.05 mole) methylene bis-4,4'-phenylisocyanate were added. The contents were stirred and heated one hour more. The reaction mixture was cooled and at 90° C., 50 ml. N-propanol were added. A film of this resin which was cast and cured over 300° C. for 10 minutes was tough and flexible.

Example 10

A flask under a nitrogen blanket was charged with 400 g. of MP, 518.4 g. (2.7 moles) of trimellitic anhydride, 534.6 g. (2.7 moles) methylene dianiline and 96.6 g. (0.3 mole) of benzophenone tetracarboxylic dianhydride. Also, 120 g. of xylene were added as an azeotrope along with 3 g. of triphenyl phosphite as a catalyst. The contents were heated up to 227° C. over a four-hour period. During this time 96.8 percent of the theoretical water was collected. A total of 1400 g. of MP was added to cut the solution to approximately 47 percent solids. After cooling to room temperature, 75.0 g. (0.3 mole) of methylene dianiline diisocyanate were added over a two-hour period. A film was prepared by dipping an aluminum panel into the solution and removing at 4 in./min. This was then cured at 150° C. for an hour and 200° C. for an additional hour. The cured film took a 180° bend without cracking.

Example 11

A flask under a nitrogen blanket was charged with 400 g. of n-methyl pyrrolidone, 518.4 g. (2.7 moles) of trimellitic anhydride, 534.6 g. (2.7 moles) of methylene dianiline, 16.6 g. (0.1 mole) of isophthalic acid, 120 g. of xylene, and 3.0 g. of triphenyl phosphite as a catalyst. The contents were heated to a maximum temperature of 226° C. The solution was then cut with 1400 g. of n-methyl pyrrolidone. After cooling, 75 g. (0.3 moles) of methylene dianiline diisocyanate were added in small amounts to the room temperature solution. The contents were then heated to 60° C. for a three-hour period. A film was prepared in the same manner as for Example 10 and the cured film took a 180° bend without cracking.

There are provided, then, by this invention new and improved amideimide group-containing polymers which are useful as paints, varnishes, films and coating and impregnating materials. They may be used as such or, as as explained above, used with suitable solvents. They can also be filled with the usual well known fillers for such materials to provide products which can be molded, if desired, or utilized in other well known manner.

What we claim as new and desire to secure by Letters Patent of the United States is:

1. A polyamideimide product comprising the reaction product of (1) the polymeric reaction product of (a) tricarboxylic acid anhydride having the formula

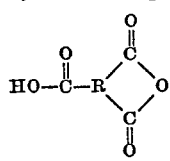

where R is a trivalent organic radical and (b) organic polyamine having the formula $$R'''—(NH_2)_n$$

where R''' is a member selected from the class consisting of halogenated and unhalogenated organic radicals of from 2 to 40 carbon atoms and groups consisting of at least two aryl residues attached to each other through the medium of a member selected from the class consisting of an alkylene radical of from 1 to 10 carbon atoms,

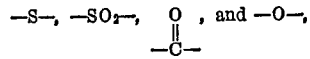

and $n$ is at least 2, and (2) organic polyisocyanate, the material of (a) being present in an amount equimolar to or in slight excess of the material of (b).

2. A product as in claim 1 wherein up to 75 mole percent of the tricarboxylic acid anhydride is replaced by material selected from aliphatic anhydrides, aliphatic diacids, aromatic anhydrides, aromatic diacids, and mixtures thereof.

3. A product as in claim 1 where said tricarboxylic acid anhydride is trimellitic anhydride.

4. A product as in claim 1 where said polyamine is selected from methylene dianiline and hexamethylenediamine.

5. A product as in claim 1 where said polyisocyanate is selected from methylene dianiline diisocyanate and tolylene diisocyanate.

6. A product as in claim 2 where said aliphatic material is selected from oxalic, maleic, succinic, glutaric, adipic, pimelic, suberic, azelaic, sebacic, dodecanedioic, maleic and fumaric materials.

7. A product as in claim 2 where said aliphatic diacid is azelaic acid.

8. A product as in claim 2 where said aromatic anhydride is benzophenone tetracarboxylic dianhydride.

9. A product as in claim 2 where said aromatic diacid is isophthalic acid.

10. The heat cured product of claim 1.

11. A base coated and impregnated with the cured material of claim 1.

12. A film prepared from the product of claim 1.

13. An electrical conductor coated with the cured product of claim 1.

References Cited
UNITED STATES PATENTS

| | | | |
|---|---|---|---|
| 3,518,230 | 6/1970 | Sheffer et al. | 260—65 |
| 3,578,639 | 5/1971 | Sheffer | 260—77.5 |
| 3,489,696 | 1/1970 | Miller | 260—2.5 |
| 3,562,217 | 2/1971 | Zalewski et al. | 260—63 |

LESTER L. LEE, Primary Examiner

U.S. Cl. X.R.

117—72, 124 E, 128.4, 132 B, 161 P; 260—30.2, 33.4 R, 33.4 P, 47 CB, 47 CP, 63 N, 65, 77.5 R, 78 TF, 857 R